United States Patent Office 2,982,097
Patented May 2, 1961

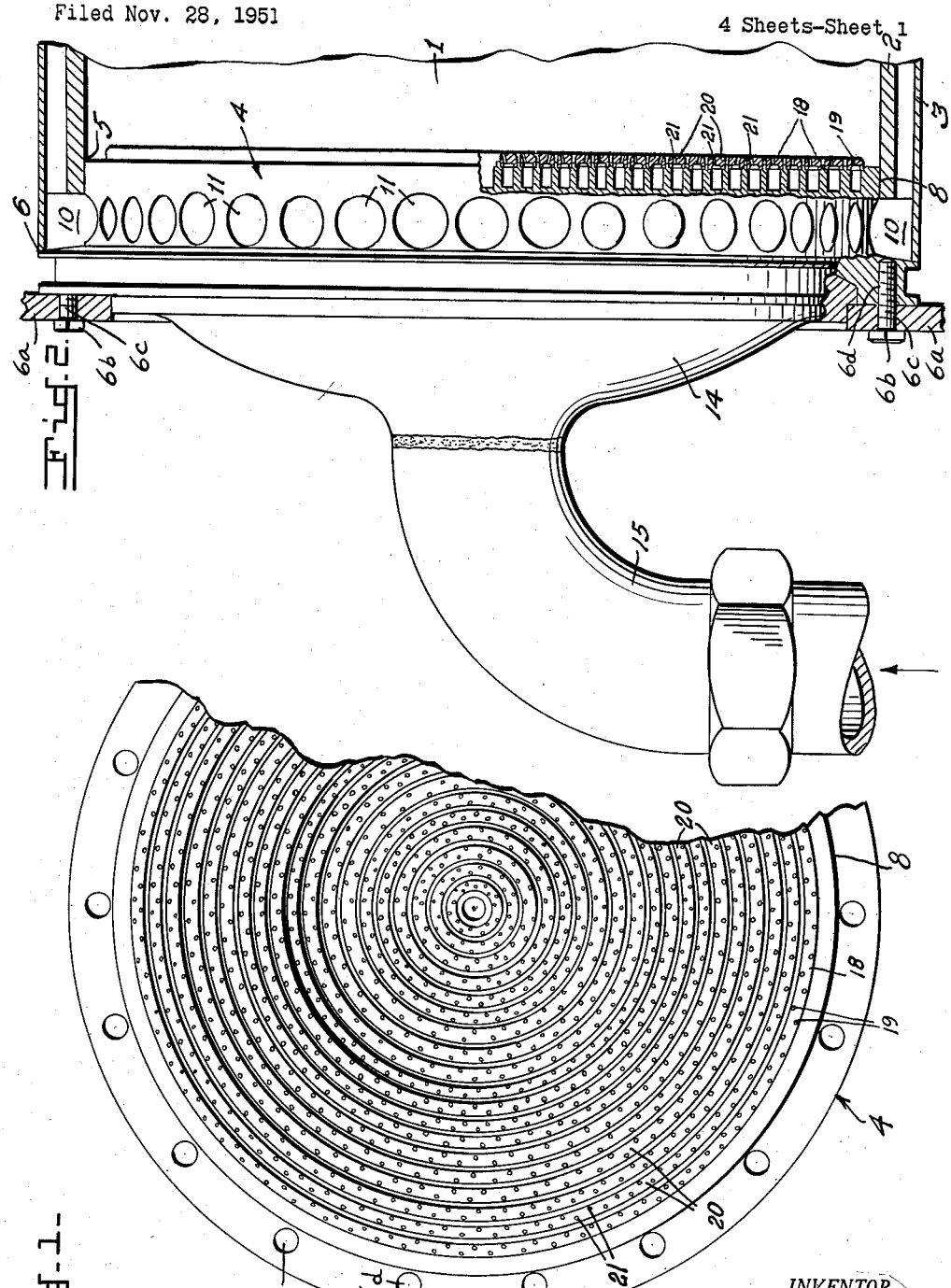

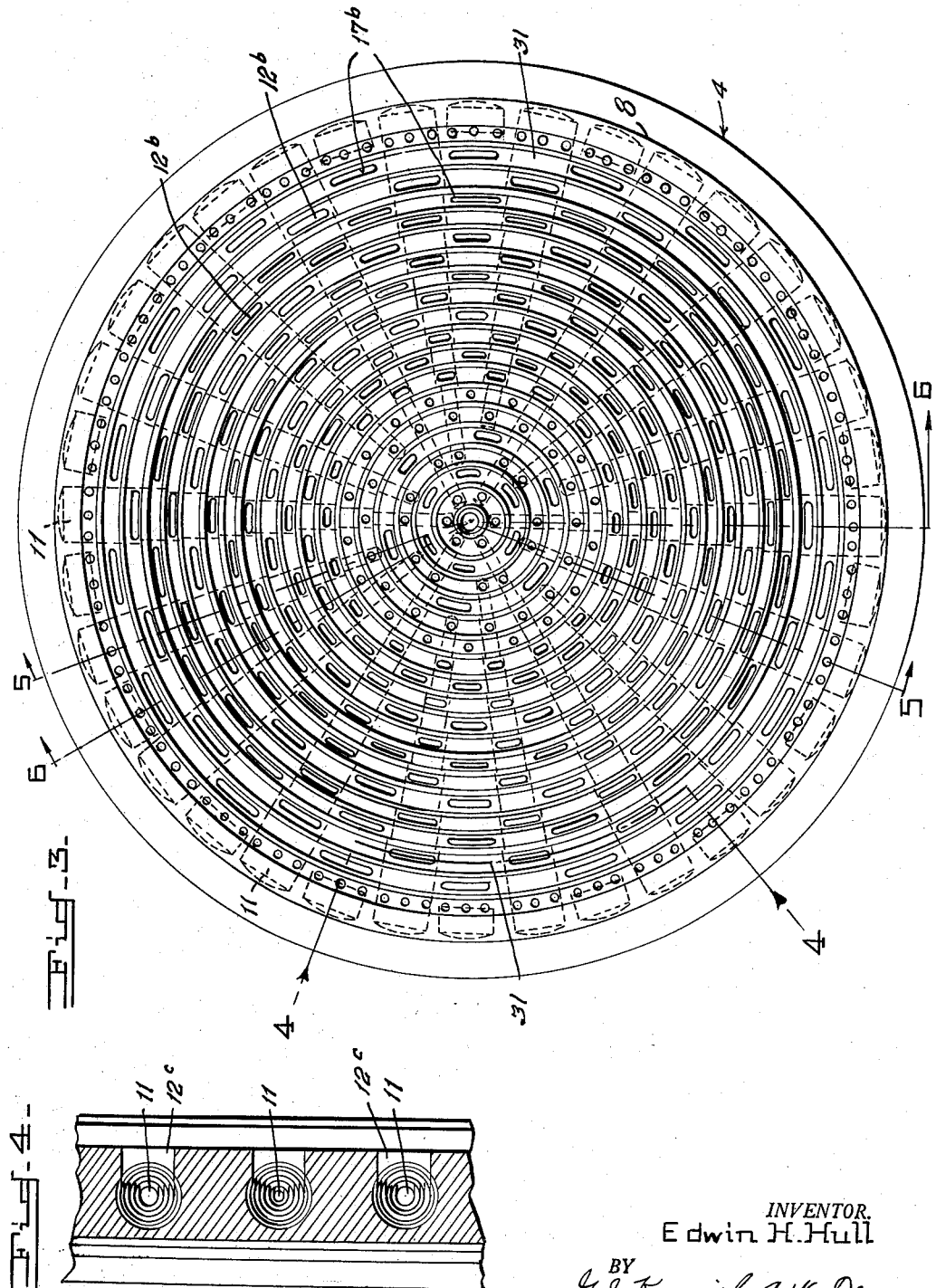

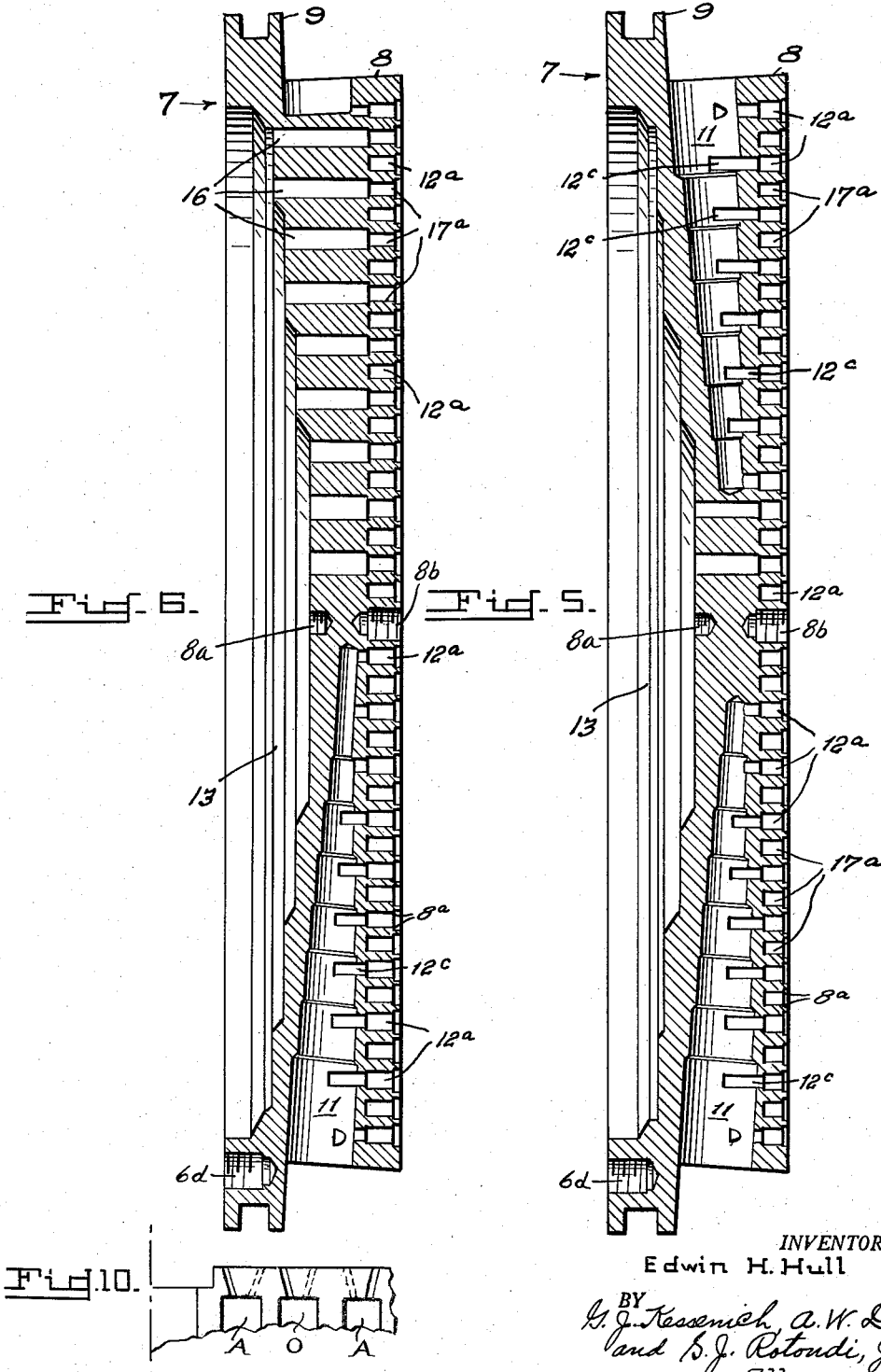

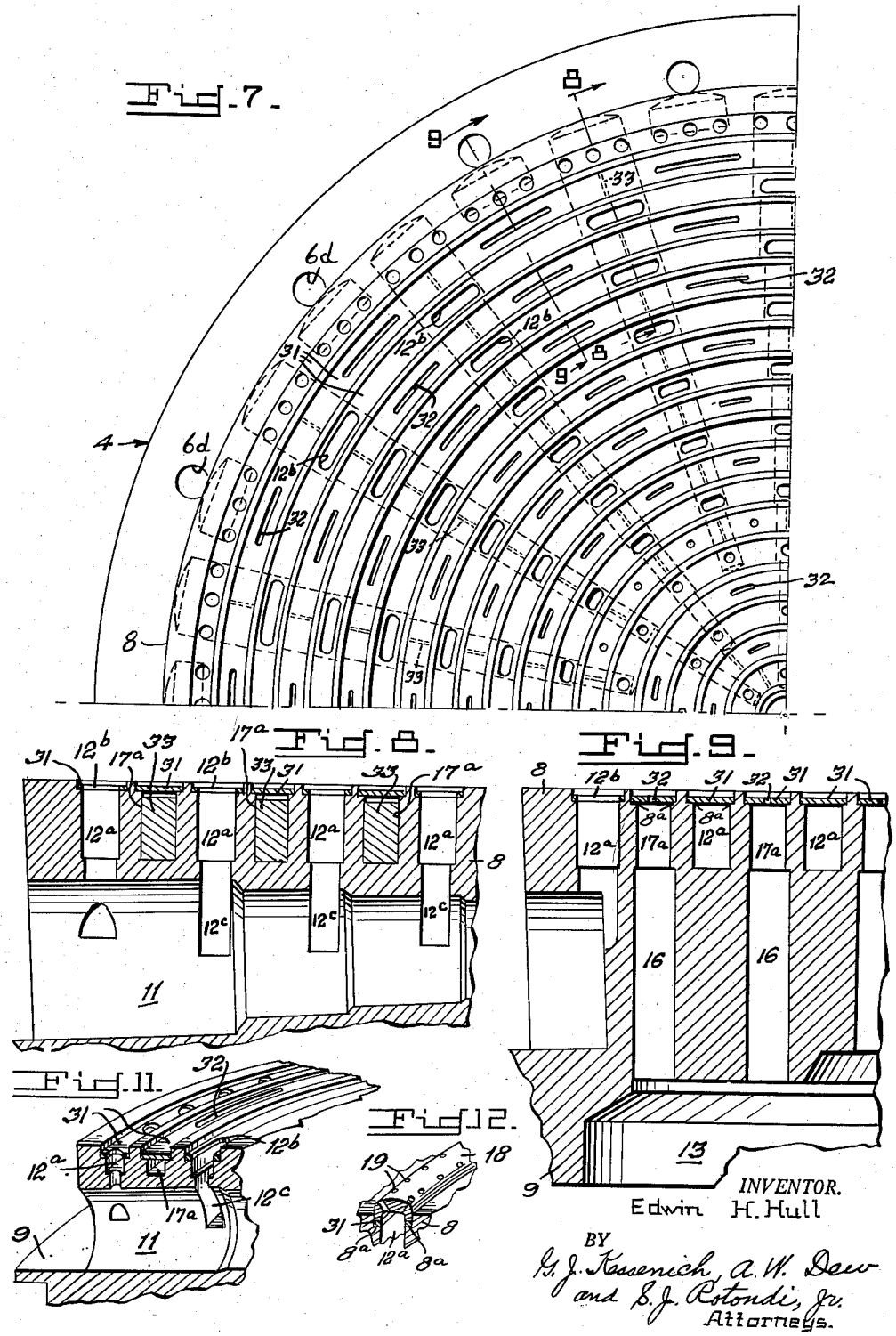

2,982,097
ROCKET MOTOR

Edwin Hodges Hull, Scotia, N.Y., assignor to the United States of America as represented by the Secretary of the Army Filed Nov. 28, 1951, Ser. No. 258,664

13 Claims. (Cl. 60—39.46)

The present invention relates to a novel head for a reactant or rocket type motor using liquid fuel as a propellant.

In certain rocket motor designs, the reactants which are utilized to impart propulsion are introduced into the combustion chamber through holes or slots in annular rings forming a part of the reactant head. The reactant most commonly used in motors of this type comprise a mixture of an oxidizer such as liquified oxygen and a fuel such as alcohol. These reactants are sprayed into the combustion chamber, intermixed and ignited to produce a flame which in turn produces the gases of propulsion. Experience has shown that poor intermixing of the fuel ingredients, and oxygen ring burn-out failures are quite frequently encountered resulting in decreased efficiency of the motor, and even in extinction of the flame in the combustion chamber.

It is therefore an object of this invention to provide a reactant head for a rocket motor which will minimize or obviate defects noted in prior art injectors.

Another object of this invention is to provide a reactant head which will insure intimate intermixing of the reactants to increase motor efficiency.

Yet another object of this invention is to provide a reactant head constructed so that burned out rings may be easily replaced.

Still another object of this invention is to disclose an improvement on my reactant head which will reduce to a minimum or almost entirely eliminate ring burn-out failure.

These and other objects of my invention may be better understood by reference to the accompanying drawing in which:

Figure 1 shows a view in plan of the reactant head with the rings in place.

Figure 2 is a slightly enlarged view in elevation and partly in section of the reactant head.

Figure 3 is a plan view of the back plate or head plate with the reactant rings removed.

Figure 4 is a fragmentary arcuate section, to an enlarged scale, taken on line 4—4 of Figure 3 and showing the radial conduits for supplying alcohol to the back plate slots.

Figure 5 is a section to an enlarged scale taken on line 5—5 of Figure 3 showing the back plate with slot forming bars and rings removed.

Figure 6 is a section to an enlarged scale taken on line 6—6 of Figure 3 showing the back plate with slot forming bars and rings removed.

Figure 7 is a modification of the head plate shown in Figure 3 wherein dams have been placed in the grooves between the slots below the oxygen rings, and wherein the oxygen slots have been constricted to increase the pressure drop therethrough.

Figure 8 is a section to an enlarged scale taken on line 8—8 of Figure 7.

Figure 9 is a section to an enlarged scale taken on line 9—9 of Figure 7.

Figure 10 is a fragmentary diagrammatic radial section of the reactant head illustrating the paths taken by the reactants through the alcohol and oxygen rings.

Figure 11 is a fragmental perspective showing details of construction of the back plate, and Figure 12 is a fragmental perspective of the reactant head with a ring in place in its channel.

In the specification and claims, the terms "forward" and "rearward" as used in connection with the reactant head plate, refer to the position or relation of the parts during horizontal flight of the rocket.

Referring to the drawing, 1 (Fig. 2) represents the combustion chamber of a rocket motor, formed by inner casing 2, outer casing 3, and reactant head 4 connected to the inner and outer casings as at 5 and 6, and to a ring 6a on the rocket by bolts 6b extending through alined holes 6c and 6d formed, respectively, in ring 6a and in reactant head 4. The other or rearward end of the combustion chamber, is provided with one or more jet-forming orifices or venturi nozzles which form no part of the present invention and have not been shown.

The head 4 comprises a back plate or head plate 7, Figures 5 and 6, which is formed as a circular flat plate or disc having a reduced rearward portion 8 and a forward portion 9. The disc is made of metal commonly used in rocket motors as, for example, copper, aluminum, or stainless steel, as is provided on its central axis with axially spaced tapped holes 8a and 8b for handling and machining purposes in the well known manner. The reduced rearward portion 8 forms with the forward portion 9 a toroidal manifold 10 (see Fig. 2) which communicates with the space between inner casing 2 and outer casing 3. A plurality of radial equiangularly spaced conduits 11 is formed in the reduced rear portion 8 of the disc. These conduits are, of course, interconnected by and in open communication with manifold 10. Conduits 11 are inwardly and axially rearwardly inclined, and are stepped to decrease in size inwardly, as shown in Figures 5 and 6, in order to obtain proper fuel pressures along the conduits. A plurality of circular concentric radially-spaced grooves or channels 12a and 17a are formed in the rearward face of portion 8. Grooves 12a and 17a alternate radially of the plate and although they are generally similar in form they have been differentiated by separate reference characters for reasons which will subsequently appear. A total of nineteen grooves are shown in the model selected for illustration. Each of the aforesaid grooves is widened adjacent the face of the plate to form annular shoulders 8a, Figures 5, 6, 9 and 12. Passages 12c, Figures 4, 5 and 6, connect each groove 12a with conduits 11. Flat rings such as 31, Figures 3 and 12, are seated in the respective grooves 12a and 17a, upon shoulders 8a, and each ring has therethrough, a number of arcuate slots 12b and 17b, respectively. In the model being described, the slots in any one ring are equal in length and are equally spaced. By this construction, a fuel component, such as alcohol, introduced under pressure into the cooling jacket between casings 2 and 3, flows into manifold 10 and thence to conduits 11, passages 12c, grooves 12a and slots 12b, to form a uniform and evenly distributed flow over and through the surface of the plate.

The forward central area of back plate 7 is hollowed out to provide a circumferentially-stepped chamber 13 which is closed by and communicates with an enlarged pipe section or fitting 14, welded or otherwise joined to elbow 15. Axial passageways 16, Figure 6, are formed in portion 8 between each of the conduits 11, and each passageway opens rearwardly into a circular groove 17a. As in the case of grooves 12a, rings 31 are pressed into grooves 17a and each of these rings in grooves 17a is provided with the before-mentioned circumferentially-spaced arcuate slots 17b therethrough, each of which slots overlies a respective passageway 16 and is thus circumferentially offset from contiguous slots 12b in the rings of grooves 12a. To résumé, a plurality of concentric radially-spaced grooves are formed in the rear face of the back plate, together with a plurality of equiangularly-spaced radially-extending conduits forwardly thereof. Each conduit communicates with each alternate groove by means of a plurality of passages extending in an axial direction between the conduit and groove. And the passage opening into the respective grooves from any one conduit, are in radial alignment. Each of the remaining grooves has a plurality of axially-extending passageways leading to chamber 13.

Metal jet-forming rings, generally U-shaped in radial cross-section are secured, as by a press fit, into each of the widened portions of each of the grooves 12a and 17a. These rings in grooves 12a are identified by the numeral 18 and in groove 17a by the numeral 20. As exemplarily shown at Figure 12 for a ring 18, each jet-forming ring abuts its underlying slotted ring 31 and maintains the latter in its groove. It will also be noted that the aforesaid jet-forming rings protrude from the rear surface of the face plate a short distance. From Figures 1 and 12 it will be noted that each of the rings 18 and 20 is provided with two circumferential rows of closely-spaced small jet-forming or atomizing holes identified at 19 for rings 18 and at 21 for rings 20. One of these rows extends about the inner periphery and the holes thereof may be inclined radially inwardly. The holes of the other row extend about the outer periphery of the ring and may be inclined radially outwardly. Furthermore, the holes 19 may be so disposed that each forms a pair with a hole 20 in the next adjacent ring whereby the jets from the holes of a pair impinge and intermix. A second fuel component, liquified oxygen for example, is introduced under pressure into chamber 13 by way of connections 14 and 15, flows into passageways 16 thence into grooves 17a and is expelled from slots 17b. It is noted that the innermost or first of the grooves 12a and each alternate or odd-numbered groove starting with the first, are for alcohol, whereas every other or even-numbered of the grooves 17a starting with the second intermost groove conduct oxygen.

The described reactant head has proved extremely effective in achieving a desired spray pattern and for proper intermixing of the reactants, however this construction may be inadequate to check additional oxygen ring burn out in the event a section of one or more of the oxygen rings burns out, a result which occasionally does occur. The following explanation indicates the manner in which additional oxygen ring burn out occurs. Assume that during the running of a rocket motor a 1 or 2 inch section of an oxygen ring 20 has burned out. Since the pressure drop through the ring holes 19 and 21 ordinarily is considerably greater than the drop through the slots 12b and 17b, which is almost negligible, a large liquid oxygen flow will be established through the burned out portion of the oxygen ring. This increased flow will in part be supplied by the slot or slots in the immediate vicinity of the burned out portion, the remainder being diverted from the other slots and will flow tangentially about the oxygen groove and out through the burned out hole. This diversion will starve the other surrounding slots because of the reduction in flow in the oxygen grooves to thereby reduce oxygen cooling on the rings. It is also believed that under such conditions, boiling of the liquid oxygen takes place in the space behind the rings. Ring burn out follows rapidly as ring cooling is reduced. In order to prevent or reduce to a minimum this starvation I propose to constrict the slots supplying oxygen to the oxygen rings to increase the pressure drop therethrough. It is suggested that the constriction be sufficient to increase the pressure drop to a value about equal to the pressure drop occurring in the flow of alcohol through the cooling jacket, alcohol grooves and slots, and the rest of the alcohol line. It can readily be seen that this increase in pressure drop through the oxygen slots will minimize the tendency to divert oxygen from the surrounding slots in the event of ring burn out failure.

A second reason for additional ring burnout can be explained in the following manner. As soon as a first oxygen ring burn out occurs, and as explained above, flow will take place in a tangential direction in the oxygen groove to supply the additional oxygen escaping through the burned out hole. A reduced pressure results in the space behind the oxygen rings. Tests have shown that this reduced pressure oft times is followed by additional ring burn out at a point 180° removed from the location of the original burned out hole, since this is the point at which flow divides to travel to the burned out holes. In order to prevent this tangential flow, I propose to place dams in the oxygen grooves at the midpoint between each oxygen slot. These dams may be metal inserts which can block off tangential flow entirely or they may be restricted to a size block off all but a small amount of tangential flow. The latter expedient appears preferable since oxygen cooling of the rings is greater, which is desirable.

Figures 7, 8 and 9 show a reactant head similar with the one previously described but modified to incorporate the dams and constricted oxygen slots generally described in the preceding paragraphs. Similar to the species represented by Figures 1-6, reference character 4 refers to a reactant head comprising back plate having reduced forward portion 8 having radial conduits 11 formed therein and a forward portion 9. Portion 8 is provided with a plurality of concentric radially spaced grooves, the alcohol grooves being represented by 12a with conduit 11 and passages 16 connect grooves 17a with oxygen chamber 13. Flat ring bars 31 may be press fitted into place onto the annular shoulders 8a formed in the rings superimposed over alcohol grooves 12a. Constricted slots 32 are formed in the flat rings superimposed over oxygen grooves 17a and dams 33 are press fitted into the oxygen grooves midway between the constricted slots.

It is apparent that my invention is important from the standpoint of achieving efficient combustion in the chamber of a rocket motor and keeping a rocket running once it has been started.

Other modifications and alterations of structure which has been disclosed herein for purposes of illustration will be apparent to one skilled in the art, and it is obvious that the same may be made without departing from the spirit and scope of the invention as defined in the following claims.

What I claim is:

1. A reactant head for a rocket motor comprising a disc-shaped back plate having a forward portion of enlarged diameter and a rearward portion of reduced diameter, said rearward portion having a plurality of equiangularly spaced inwardly and rearwardly inclined conduits of progressively decreasing size, there being a plurality of spaced concentric grooves in said rearward portion, said rearward portion having passage for connecting said conduits to the innermost and to each alternate succeeding groove, an axially extending stepped cylindrical chamber formed in said reactant head forwardly of said conduits, there being passages connecting said cylindrical chamber to each remaining groove, means spanning each said spaced concentric groove and having formed therein a plurality of equiangularly spaced slots, and a ring having a plurality of small holes superimposed over each said concentric groove and above said slot forming means.

2. In combination with a combustion chamber for a rocket motor utilizing liquid propellants, a reactant head comprising a disc-shaped head plate having a forward portion of enlarged diameter and a rearward portion of reduced diameter, a first casing secured to the outer peripheral surface of said enlarged portion, a second casing concentric with said first casing secured to the peripheral surface of said reduced portion, said rearward portion having a plurality of equiangularly spaced conduits in open communication with the space formed between said casings, there being a plurality of spaced concentric grooves in said rearward portion, said rearward portion having formed therein axially extending passages connecting said conduits to the innermost and to each alternate succeeding groove, an axially extending stepped cylindrical chamber formed in said reactant head forwardly of said equiangularly spaced conduits, there being axially-extending passages connecting said cylindrical chamber to each remaining groove, means spanning each said spaced concentric groove and having formed therein a plurality of equiangularly spaced slots, and a ring having a plurality of small holes and secured in superimposition over each said concentric groove and above said slot forming means.

3. The combination in claim 2 including means for introducing a first reactant under pressure to said space between said casings and therethrough to said first set of grooves, and means for introducing a second reactant under pressure to said cylindrical chamber and to said second set of grooves.

4. The combination in claim 3 wherein said first reactant is a liquid fuel and said second reactant is an oxidizer.

5. The combination in claim 3 wherein said first reactant is alcohol and said second reactant is liquified oxygen.

6. In a reactant head for a rocket motor, a disc-shaped back plate having a forward portion of enlarged diameter and a rearward portion of reduced diameter, said rearward portion having a plurality of spaced concentric grooves in its rearward face, means spanning said innermost and each alternate succeeding groove and having formed therein a plurality of equiangularly spaced slots, means spanning each said remaining groove and having formed therein a plurality of equiangularly spaced constricted slots, and means superimposed over each said concentric groove above said slot forming means and having formed therein a plurality of small jet-forming holes.

7. In a generally circular reactant back plate for a rocket motor, first and second contiguous concentric grooves in the rearward face of said plate, a plurality of equally-circumferentially-spaced radial conduits in said plate opening through the periphery thereof, a passage from each conduit to said first groove, means forming with the forward face of said plate a pressure chamber, a plurality of equally-spaced passageways extending axially through said plate from said chamber to each of said second grooves, and a dam in each of said second grooves between each said passageway.

8. A reactant back plate for a rocket motor, said plate having a plane rearward face, a plurality of coaxial circular grooves in said face, the innermost and each alternate succeeding groove forming a first set, the remaining of said grooves forming a second set, a plurality of equiangularly spaced generally radial conduits decreasing in diameter in the radially inward direction in said plate, each opening only through the periphery thereof, there being an axially extending passage from each said conduit to each groove of said first set, means forming with the forward face of said plate a fluid pressure chamber, there being a plurality of axially extending equally circumferentially spaced passageways from each groove of said second set to said pressure chamber, each said groove in said first and second set having a peripheral rearwardly-facing shoulder, a plurality of flat rings, each having a plurality of equally spaced arcuate slots therethrough, each ring fitting in and resting upon the shoulder of a respective groove, each slot of the rings of said first set of grooves being over a respective conduit and passage thereto, and each slot of the rings of said second set being over a respective passageway to said pressure chamber.

9. A reactant back plate as recited in claim 8 the slots in the rings in said second set of grooves being of less area than the corresponding slots in the rings in said first set of grooves.

10. A reactant back plate as recited in claim 8, and a dam in each of said second set of grooves intermediate each contiguous pair of slots of less area.

11. A reactant back plate for a rocket motor having a plane rearward face, a plurality of coaxial circular channels in said face, the innermost and each alternate succeeding channel forming a first set, the remaining channels forming a second set, a plurality of equiangularly spaced, generally radial conduits in said plate each opening only through the periphery thereof, there being an axial passage from each said conduit to the channels of said first set, means forming with the forward face of said plate a pressure chamber, there being a plurality of equally circumferentially-spaced axial passageways from each channel of said second set to said chamber, there being an annular passageway between each contiguous pair of conduits, a jet forming inverted U shaped ring secured in each channel, each said ring having a plurality of small, closely spaced jet-forming holes therethrough, a flat ring secured in each said channel between the bottom thereof and the jet-forming ring therein, each flat ring in said first set of channels having a plurality of slots overlying each conduit, respectively, each flat in said second set of channels having a plurality of slots with each slot overlying a respective one of said axial passageways.

12. A back plate as recited in claim 11, the slots in the flat rings in said second set of channels being of less effective area than the corresponding slots in the flat rings of said first set of channels.

13. A back plate as recited in claim 12, and a plurality of equally-circumferentially-spaced channel constructing members in each channel of said second set and intermediate each contiguous pair of slots of less effective area.

References Cited in the file of this patent

UNITED STATES PATENTS

| | | |
|---|---|---|
| 1,903,032 | Dufault | Mar. 28, 1933 |
| 1,985,920 | Elliot et al. | Jan. 1, 1935 |
| 1,985,957 | Spear | Jan. 1, 1935 |
| 2,022,871 | Sherman et al. | Dec. 3, 1935 |
| 2,532,709 | Goddard | Dec. 5, 1950 |
| 2,551,112 | Goddard | May 1, 1951 |
| 2,555,081 | Goddard | May 29, 1951 |
| 2,591,421 | Goddard | Apr. 1, 1952 |